July 13, 1965  H. R. KILLIAN  3,193,914
METHOD OF MAKING A BUTTERFLY VALVE WITH AN INTEGRAL SEAT
Original Filed April 17, 1961  2 Sheets-Sheet 1

Inventor:
Henry R. Killian
By: Hofgren, Brady, Wegner,
Allen & Stellman
Attorneys July 13, 1965    H. R. KILLIAN    3,193,914
METHOD OF MAKING A BUTTERFLY VALVE WITH AN INTEGRAL SEAT
Original Filed April 17, 1961    2 Sheets-Sheet 2
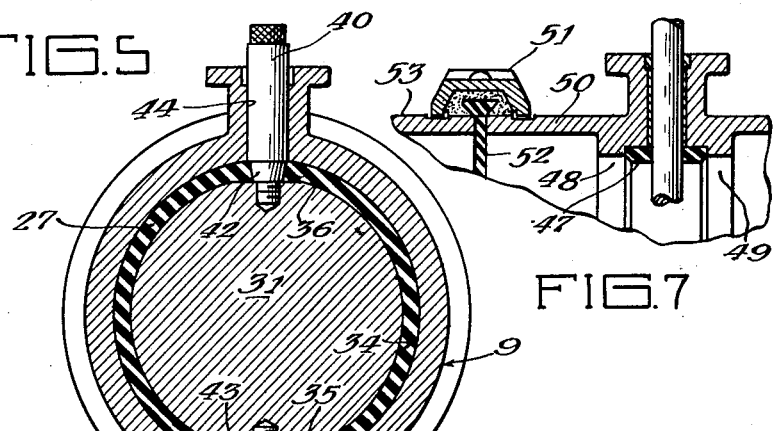
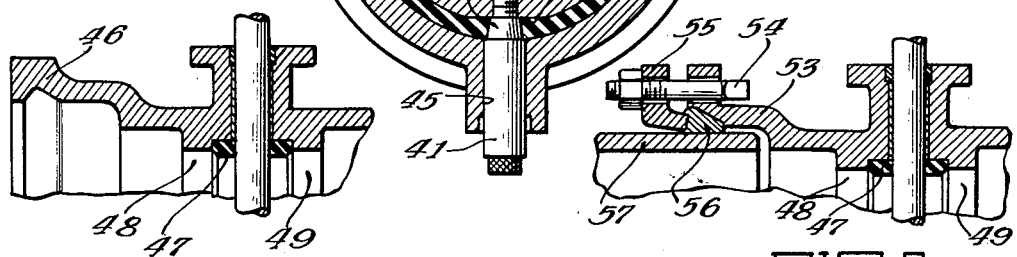
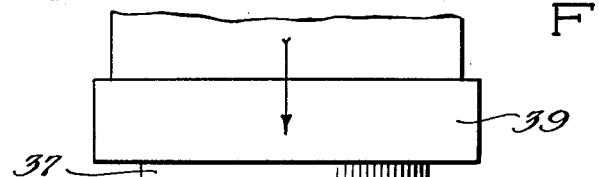
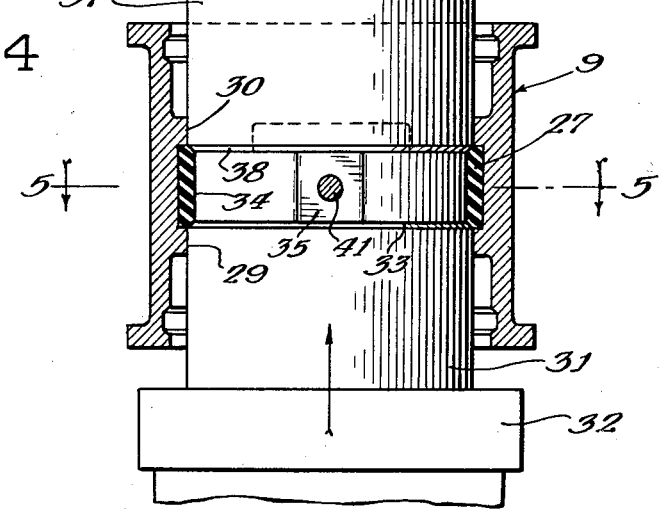

000
United States Patent Office 3,193,914
Patented July 13, 1965

3,193,914
METHOD OF MAKING A BUTTERFLY VALVE WITH AN INTEGRAL SEAT
Henry R. Killian, Glen Ellyn, Ill., assignor to Henry Pratt Company, a corporation of Illinois
Original application Apr. 17, 1961, Ser. No. 103,491. Divided and this application June 8, 1962, Ser. No. 201,007
3 Claims. (Cl. 29—157.1)

This invention relates to a butterfly valve structure and methods employed for the manufacture of such valves. The present application is a division of my co-pending application, Serial No. 103,491, filed April 17, 1961.

The particular butterfly valves with which this invention is concerned are those in which the valve body or housing has flanges of one type or another for connection with adjoining pipe sections. The valve has a closure or disc mounted on a shaft rotatable through about 90° in trunnion bearings in the housing to open and close the valve. When open, the valve disc sits in the flow of fluid through the valve. When closed, the periphery of the disc engages a resilient seat which is molded in place in the valve housing and thus permanently bonded to the metal of the housing.

The primary object of this invention is to provide a novel method for manufacturing a new valve providing improved operation.

Another object is to provide a novel method of accurately manufacturing a butterfly valve at less expense than heretofore, while producing a valve longer lasting in use.

Another object is to provide a novel method of casting a butterfly valve housing which requires very little machining for receiving an accurately made resilient seat.

Other objects, features and advantages of the present invention will be apparent from the following description of embodiments of the invention illustrated in the accompanying drawings, in which:

FIGURE 4 is an elevational view partly in section of the valve housing in a press and mold for receiving the resilient seat.

FIGURE 5 is a horizontal sectional view through the valve mold and seat taken substantially along line 5—5 of FIGURE 4.

FIGURES 6, 7 and 8 are fragmentary sectional views through the upper portion of the valve similar to the showing of FIGURE 3, illustrating the form of the flanges of valves equipped for connection to pipe lines in different manners.

Figure 2:
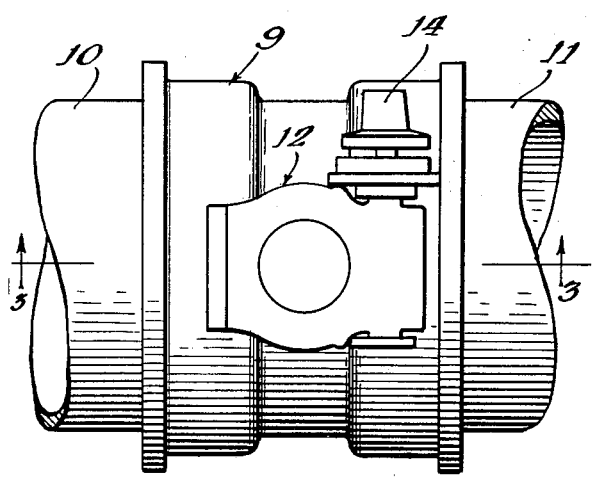
FIGURE 2 is an enlarged fragmentary elevation of the valve shown in FIGURE 1.
Figure 1:
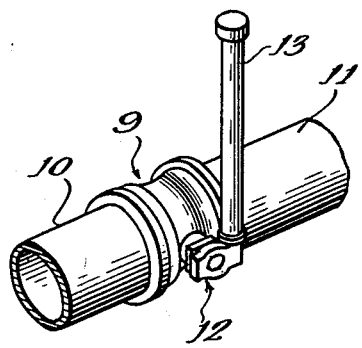
FIGURE 1 is a broken perspective view of a valve mounted in a buried pipe line.

The valves of this invention may be used in many industries and are a matter of frequent use in water works, power plant, manufacturing and industries of like nature. In FIGURE 1 there is an illustration of a valve 9 connected with pipe sections 10 and 11, the valve being operated by a geared operator 12 attached to the shaft of the valve. Some services such as water works often require a valve to be underground, and in such instances the valve may be operated from the ground level through an access tube 13 sitting over a standard American Water Works Association square nut 14 on the geared valve operator 12. As better shown in FIGURE 3, the operator 12 is connected to an extension of the central shaft 15 of the valve for the purpose of opening and closing the valve.

Figure 3:
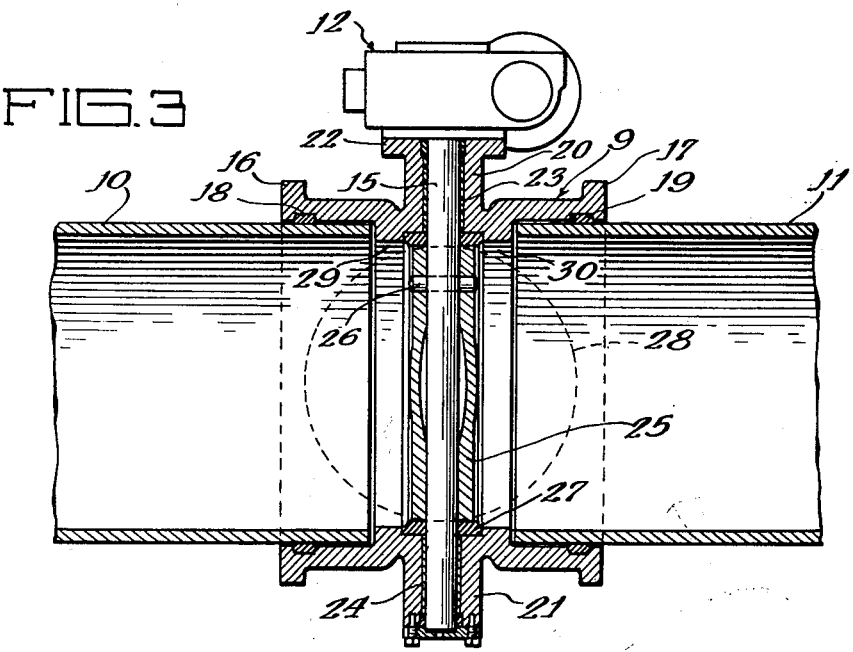
FIGURE 3 is a cross sectional view through the valve taken substantially along line 3—3 in FIGURE 2.

The structure of the butterfly valve is best illustrated in FIGURE 3. The housing of the valve 9 is a cast annular shaft member having annular flanges 16 and 17 into which the pipe sections 10 and 11 may be connected. In the illustration of FIGURE 3 the connection is performed by what is often referred to as a ring-tite construction including an annular rubber gasket 18 and 19. The housing also has diametrically opposite sleeve portions 20 and 21 for providing the bearings for the shaft 15. The upper sleeve portion may be provided with a flange 22 for supporting the valve operator 12. Each of the sleeve portions are carefully machined to provide the trunnion bearing for the shaft, the bearing itself being a sleeve 23 and 24 of nylon bearing material. The bearings for the shaft were accurately positioned so that the center line thereof intersects and is at a right angle to the center line through the valve in the direction of fluid flow.

The valve closure includes a disc 25 pinned to the shaft by a cold-formed rivet 26 and a resilient seat 27 of rubber material. The disc 25 is accurately made so that its periphery is circular except for the portions surrounding the shaft referred to as the hub portions of the disc. In general, the hub portions are flat and the shape of the seat is made to conform thereto. When the disc is opened to the dotted line position 28 illustrated in FIGURE 3, the hub portions of the disc remain in sealing contact with the seat.

The inner surface of the resilient seat contacted by the disc is accurately formed by molding it in place in the casting 9 to insure that the circular portions thereof are centered about the center line through the valve. Two surfaces, 29 and 30 on either side of the seat, are accurately machined on the center line of the valve so as to be concentric with the center line. These surfaces are the guides by which the valve seat material is accurately located.

The method of placing the seat in the valve housing is illustrated in FIGURES 4 and 5. A lower mold member 31 is placed upon the bed 32 of a press and the outer surface of the mold is circular so as to engage and pilot upon the circular accurately machined surface 29 in the valve housing 9. The lower mold member has a shoulder 33 immediately above the piloted section and an accurately formed circular surface 34 immediately thereabove. The surface 34 is flattened at the hub areas of the seat such as 35 and 36 best seen in FIGURE 5. The surfaces 34, 35 and 36 are accurately formed and centered within the valve housing when the mold member pilots upon the circular surface 29 in the valve housing. The resultant seat surface of the resilient material 27, conforming to the mold will thus be extremely accurately formed.

In the process of forming the seat a measured amount of raw rubber stock (a proper compound for vulcanization) is placed in the cavity formed between the mold member 31 and the valve housing. An upper mold member 37 also pilots upon the circular surface 30 in the valve housing as well as operating to close the cavity in which the rubber material is trapped. The upper mold member also has a bevel surface 38 at its outer end which meets the surface 34 on the lower mold member. The ram 39 of the press holds the mold parts and valve in their assembled relation and applies the pressure necessary to the vulcanization of the seat material. Heat may be added as needed during this process. The housing is maintained in position on the mold by a pair of stripper bolts 40 and 41 threaded into the lower mold member 31 and having a tapered section 42 and 43 respectively for forming the bore through the seat which is to receive the shaft of the valve. The tapered bore through the seat material is smallest at the juncture of the bore with the inner surface of the seat. The tightest area on the valve shaft will thus occur at the seat surface. The stripper bolts or pins are each accurately made to pilot on the machined bearing surfaces 44 and 45 respectively so that the combination of the mold members piloting on the surfaces 29 and 30 in the valve body and the stripper bolts piloting upon the machined bearing surfaces 44 and 45 insures that the seat material will be centered and properly located in alignment with the trunnion bearings for the valve shaft.

Referring to FIGURES 6 to 8, it will be noted that the valve body may be cast with different forms of flanges for accommodating various commercially available type connections. In FIGURE 6 the flange 46 is formed in accordance with the American Water Works Association bell for standard bell and spigot fittings. The seat 47 in the valve is the same as that previously described. The valve is provided with circular surfaces 48 and 49 on either side of the seat so that the seat material will be accurately placed as previously described. The bearings for the valve shaft are identical to those previously described.

In FIGURE 7 a different form of flange 50 is illustrated, one for making a connection called a victaulic coupling. Malleable iron half housings 51 enclose a continuous rubber ring 52 coupling the pipe 53 to the flange 50 of the valve.

In FIGURE 8 the flange 53 of the valve is particularly made to receive an American Double-X Mechanical Joint. The flange is prepared to receive bolts 54 holding a follower ring 55 against a rubber gasket 56. The sealing occurs between the flange 53 on the valve and the outer surface of the pipe 57 by virtue of the construction just described. In each of the valve constructions shown in FIGURES 5, 6, and 7 the seat 47 is identical, as are the machined surfaces 48 and 49. The variation in construction is in the flange for receiving the connecting pipe, the remaining parts of the valve being identical in each instance.

The foregoing detailed description is given for clearness of understanding only and no unnecessary limitations are to be understood therefrom, as modifications will be obvious to those skilled in the art.

I claim:
1. The method of forming a resilient valve seat in a butterfly valve body comprising the steps of forming in a metal valve body portion a pair of opposite trunnions on a common center line and a pair of spaced internal cylindrical surfaces concentric with the desired seat surface and about an axis intersecting the trunnion center line centrally between the trunnions,
 placing the valve body about a mold member having a surface shaped to the desired internal surface of the seat,
 piloting one of said cylindrical valve body surfaces into engagement with said mold part to locate the seat internal surface forming portion of the mold to a central location within the valve body between said trunnions,
 inserting pins through the valve body and into the mold part to support the valve body on said mold part and to form openings in the valve seat for a valve shaft,
 placing a predetermined amount of unvulcanized rubber-like material compound between said mold part and body,
 closing the space between said mold part and body with an upper mold part engaging the other of said cylindrical valve body surfaces,
 then applying heat and pressure simultaneously shaping, vulcanizing and bonding the rubber-like material to the valve body to form an inner valve seating surface of the shaped surface of said mold part.

2. The method of forming a resilient seat of rubber-like material in a valve body in a precise location therein, comprising the steps of forming opposite trunnions in the housing on a center line extending across the direction of fluid flow through the valve,
 machining an internal cylindrical surface in the metal valve body concentric with the desired seat surface and about an axis intersecting the trunnion center line centrally between the trunnions,
 piloting the valve body on to a first mold part by engagement of said cylindrical surface with a mating cylindrical surface on the first mold part to locate the valve body about such mold part so that the valve body may move relative to such mold as permitted by said engaging cylindrical surfaces,
 aligning the valve body relative to the first mold part with pins engaging said trunnions and said mold, said mold having a portion opposite said trunnions shaped to the desired inner surface contour of the valve seating surface and forming together with said valve body a space for resilient material,
 filling the space between the valve body and mold with rubber-like material,
 closing the mold with a second mold part engaging said valve body and first mold part,
 and then simultaneously vulcanizing, molding and bonding the rubber-like material to the metal valve body.

3. The method of forming a resilient valve seat in a valve body in a precise desired location, comprising the steps of forming guide and pilot surfaces in the valve body including a circular cylindrical surface about an axis extending longitudinally in the direction of fluid flow and trunnions on a common center line intersecting the axis of said cylindrical surface,
 locating a mold part within the valve body by piloting a mating surface on the mold part against said cylindrical surface on the valve body and aligning said trunnions with a surface of said mold part by means of pins which engage said trunnions and mold part, said mold having a surface shaped to the desired valve seating surface shape for the valve seat,
 said surface being spaced from the valve body when so located to form a mold cavity,
 filling the cavity with rubber-like material,
 and then simultaneously molding, vulcanizing and bonding the valve seat material to the metal valve body with heat and pressure in the cavity.

References Cited by the Examiner

UNITED STATES PATENTS

| | | |
|---|---|---|
| 1,808,047 | 6/31 | Littleton. |
| 2,448,483 | 8/48 | Bassett. |
| 2,554,008 | 5/51 | Burger. |
| 2,815,253 | 12/57 | Spriggs. |
| 3,050,781 | 8/62 | Killian. |
| 3,051,435 | 8/62 | Ramsey _____ 251—306 |

FOREIGN PATENTS

| | | |
|---|---|---|
| 1,227,015 | 2/60 | France. |
| 1,237,203 | 6/60 | France. |

WHITMORE A. WILTZ, *Primary Examiner.*